Apr. 10, 1923. 1,451,611
C. B. HAUGHEY
PRINTING VULCANIZER
Filed Dec 30, 1921.
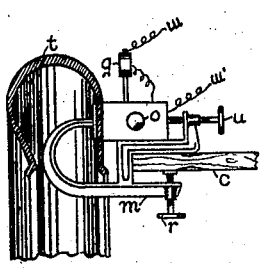
Fig.1.
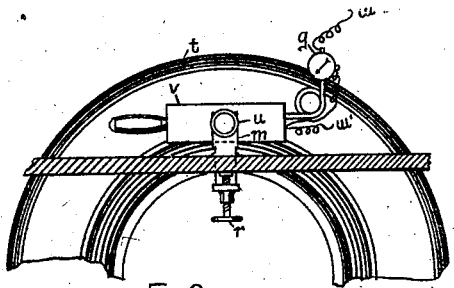
Fig.2.
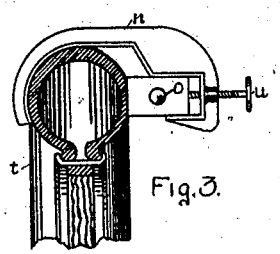
Fig.3.
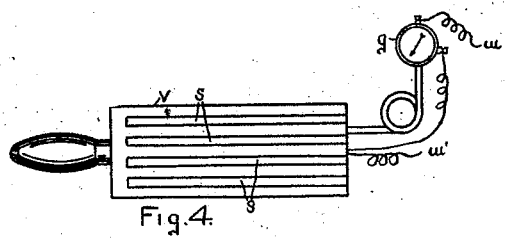
Fig.4.
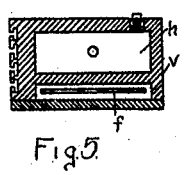
Fig.5
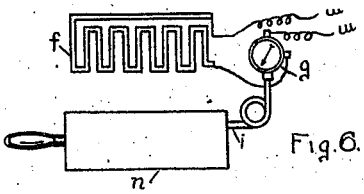
Fig.6.
Fig.8. Fig.9.
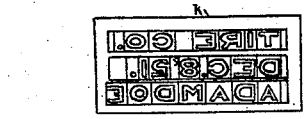
Fig.10. 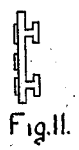 Fig.11.
Fig.7.
Fig.12.
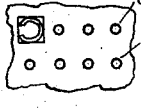
Fig.13.
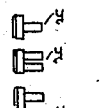
Fig.14.
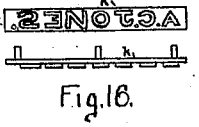
Fig.15.
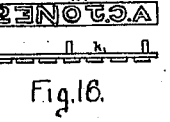
Fig.16.
INVENTOR.
CHARLES B. HAUGHEY.
BY Clem. F. Kimball,
ATTORNEY.

Patented Apr. 10, 1923.

1,451,611

UNITED STATES PATENT OFFICE.

CHARLES B. HAUGHEY, OF COUNCIL BLUFFS, IOWA, ASSIGNOR OF ONE-HALF TO ORIN R. EDWARDS, OF DAVENPORT, IOWA.

PRINTING VULCANIZER.

Application filed December 30, 1921. Serial No. 525,974.

*To all whom it may concern:*

Be it known that I, CHARLES B. HAUGHEY, a citizen of the United States, residing at Council Bluffs, in the county of Pottawattamie and State of Iowa, have invented a new Printing Vulcanizer, of which the following is a specification.

My invention relates to improvements in printing vulcanizers in which movable type and plates are used in connection with a vulcanizing means; and the objects of my improvement are, first, to provide a means for marking rubber tires or other rubber articles wherein it is desired to print a name or number or date upon the same after the tire or other article is manufactured; second, to afford such a printing vulcanizer that may be applied to any tire or other article while the same is in place; third, to provide such a printing vulcanizer that part or all of the matter to be printed may be quickly changed as the name of the owner of the article to be marked or of the date or number.

I attain these objects by the structure illustrated in the accompanying drawing, in which—

Figure 1 is an end view of the printing vulcanizer with clamp adapted to be attached to any bench or table; Fig. 2, a side elevation of the printing vulcanizer as shown in Fig. 1; Fig. 3 is an end view of the vulcanizer with clamp arranged to vulcanize a tire when in position on the rim; Fig. 4 is a side elevation of the printing vulcanizer with the type or plate removed; Fig. 5 is a cross-section of the vulcanizer; Fig. 6 is a diagram of the water chamber and heat filament of the vulcanizer; Fig. 7 is a cross section of a portion of the vulcanizer showing slots adapted to engage type or plate matter; Fig. 8 is a side elevation of a movable type used with said vulcanizer; Fig. 9 is a plan of the movable type shown in Fig. 8; Fig. 10 is a plan of type in plate form; Fig. 11 is an end elevation of the plate shown in Fig. 10; Fig. 12 is a cross-section of vulcanizing member with type attached; Fig. 13 is a plan of a portion of the vulcanizing means with means for applying movable type showing type in place; Fig. 14 is a side elevation of various forms of type; Fig. 15 is a plan of a single line plate; Fig. 16 is a side elevation of plate shown in Fig. 15.

Similar letters refer to similar parts throughout the several views.

A vulcanizing block or part $v$, is arranged with a hot water chamber $h$, and a heating filament $f$. The water chamber $h$, is connected with a suitable gauge switch $g$, and suitable supply wires $w$, $w'$, for electrical current connect the heating filament $f$ in series with the gauge switch $g$; a clamp $m$ is adapted to be attached to any bench or table or by a screw $r$. Or the clamp may be in the form $n$, when the device is used in connection with automobile tires on the wheel. The clamps $n$ and $m$ are supplied with the usual clamping screw $u$. In some suitable place on the vulcanizing means $v$, are placed slots or holes, $s$, $s$, which slots or holes are adapted to receive the shanks of suitable types as $y$ $y$ or plates $k$ $k$. For convenience, a handle $o$, may be applied to one end of the vulcanizing means $v$. The vulcanizing block $v$ is rectangular and the clamp $m$ fits the block and is provided with a substantially hook shaped tire receiving and engaging portion located opposite the printing means and cooperating with the adjusting means to secure the vulcanizing block and the tire together.

The vulcanizing means $v$ may be of any suitable shape but here shown as a rectangular prism. The vulcanizing means $v$, may also be heated by any suitable means but preferably by an electric current as these currents are available at nearly every place where this device would be usable, and while the vulcanizing means $v$, might be heated by an electric filament $f$, without the use of water and by the use of an electric thermostat, I prefer the form having the water chamber $h$. The gauge-switch $g$, is the ordinary commercial gauge switch commonly used in connection with electrical heated vulcanizers.

Into the slots or holes $s$ $s$ are placed type $y$ $y$, or plates $k$ $k$. The water chamber $h$, is filled with water. The switch gauge $g$, and the water chamber $h$, being connected by a suitable pipe $i$. The vulcanizing means having the types $y$ $y$ on the plate $k$, attached is placed with the type $y$ $y$, or plate $k$, against the rubber object to be printed as in Figs. 1, 2, and 3, and by means of the screw $u$, clamped tightly against the rubber as $t$, to which it is applied; the current of electricity is then applied to the wires $w$ $w$, and the vulcanizing means $v$, and the movable type $y$ $y$, attached thereto will be heated by the electrical filament $f$ until the water in the chamber $h$, has caused the gauge switch $g$, to shut off the current. As soon as the heat falls below the limit required for vulcanizing, the gauge switch $g$, by the cooling of the water in the chamber $h$, will again supply current to the filament $f$, and the heat of the vulcanizing means $v$, be increased. After the vulcanizing type $y$ $y$, or vulcanizing plates $k$ $k$, have been applied to the rubber object $t$, for a sufficient length of time, the imprint of the types $y$ $y$, or the plate $k$, on the rubber object $t$, will be found to have been vulcanized into the rubber object $t$.

In this manner the name of the company selling a rubber tire or casing, the date sold, and the name of the purchaser or other matter may be printed on the tire. In a similar manner any other rubber object, here represented as a tire $t$, may be thus imprinted by a vulcanized inscription which cannot be removed or erased without cutting away part of the material of the object printed.

I claim:

1. A printing vulcanizer including a vulcanizing block having interior heating means and provided at the inner side with exterior printing means adapted to print on the exterior of a finished tire, and a clamp extending beneath and supporting the vulcanizing block in position to be applied to a tire and receiving the vulcanizing block and provided at the outer side of the block with adjusting means and having an engaging portion projecting beyond the inner side of the block and cooperating with the adjusting means for holding an article in contact with the printing means.

2. A printing vulcanizer including a vulcanizing block provided at the inner side with exterior printing means adapted to print on the exterior of a finished tire and having an interior water chamber and heating means, and a clamp receiving and supporting the vulcanizing block in position to be applied to a tire and provided with a substantially hook shaped tire receiving and engaging portion located opposite the printing means of the block, and adjusting means carried by the clamp and arranged to engage the vulcanizing block and cooperating with the said hook shaped portion for securing a tire in contact with the printing means of the vulcanizing block.

3. A printing vulcanizer including a vulcanizing block, a clamp having a horizontal portion adapted to receive the vulcanizing block and support the same in position to be applied to the exterior of a finished tire at the side thereof, said clamp having an integral approximately hook-shaped tire engaging arm extending horizontally from the clamp, and adjusting means carried by the clamp and engaging the vulcanizing block at the outer side thereof and cooperating with the said arm for clamping the printing vulcanizer to a tire.

CHAS. B. HAUGHEY.

Witnesses:
CLARA M. SCHWARTZ,
RAYMOND A. SMITH.